(12) United States Patent
Watson et al.

(10) Patent No.: US 9,365,108 B2
(45) Date of Patent: Jun. 14, 2016

(54) INTEGRATED ANTI-SIPHON FUEL FILLER ASSEMBLY AND METHOD OF MANUFACTURING THE SAME

(76) Inventors: Kenneth A. Watson, Vancouver, WA (US); Evan S. Waymire, Oregon City, OR (US)

( * ) Notice: Subject to any disclaimer, the term of this patent is extended or adjusted under 35 U.S.C. 154(b) by 55 days.

(21) Appl. No.: 13/373,471

(22) Filed: Nov. 15, 2011

(65) Prior Publication Data

US 2012/0125927 A1 May 24, 2012

Related U.S. Application Data

(60) Provisional application No. 61/458,198, filed on Nov. 18, 2010.

(51) Int. Cl.
*B60K 15/04* (2006.01)

(52) U.S. Cl.
CPC ......... *B60K 15/0403* (2013.01); *Y10T 83/0448* (2015.04)

(58) Field of Classification Search
CPC .................................................... B60K 15/0403
USPC ............................................................ 220/86.3
See application file for complete search history.

(56) References Cited

U.S. PATENT DOCUMENTS

| 1,813,554 | A | * | 7/1931 | Wickline | 220/86.3 |
| 4,034,784 | A | * | 7/1977 | Ball et al. | 141/348 |
| 4,630,748 | A | * | 12/1986 | Keller | 220/86.3 |
| 7,040,360 | B2 | * | 5/2006 | Watson | 141/255 |
| 2006/0185760 | A1 | * | 8/2006 | Matsuzaki et al. | 141/286 |
| 2012/0152948 | A1 | * | 6/2012 | Watson et al. | 220/86.1 |
| 2013/0092290 | A1 | * | 4/2013 | Waymire et al. | 141/286 |

* cited by examiner

*Primary Examiner* — Stephen Castellano
(74) *Attorney, Agent, or Firm* — Ingrid McTaggart

(57) ABSTRACT

One embodiment of an integrated anti-siphon fuel filler assembly includes a fuel tank and tube means including a first end region adapted to be secured directly to the fuel tank for allowing fuel to flow therethrough into an opening of the tank, and restriction means positioned in the tube and defining apertures for the flow of fuel there through.

8 Claims, 1 Drawing Sheet

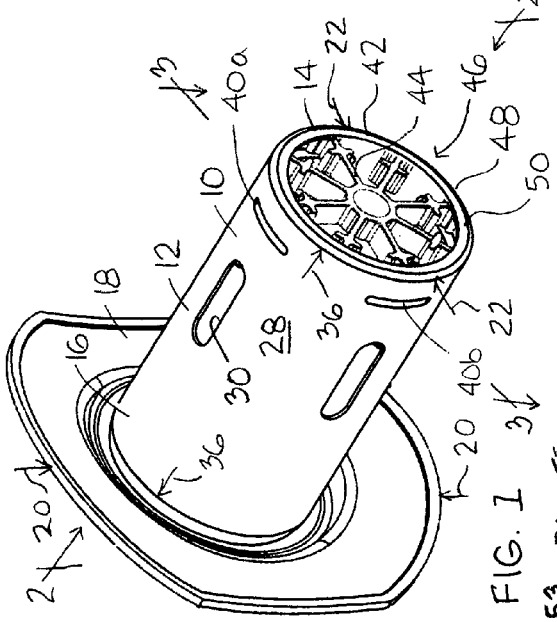

INTEGRATED ANTI-SIPHON FUEL FILLER ASSEMBLY AND METHOD OF MANUFACTURING THE SAME

This application claims priority on a provisional patent application, having the same title, filed on Nov. 18, 2010, and given U.S. Patent Application Ser. No. 61/458,198, and listing the same inventors, Kenneth A. Watson and Evan S. Waymire.

BACKGROUND OF THE INVENTION

The present invention is particularly intended for use on fuel tanks on commercial vehicles, although it may be used on any fuel tank connected to any type of engine. Fuel tanks typically include a filler tube inlet or opening through which fuel is filled into the fuel tank. On commercial vehicles the fuel tanks may be quite large. Due to high cost of fuel, these large fuel tanks may be susceptible to illegal siphoning of the fuel from the fuel tank.

Siphoning of fuel from a fuel tank generally involves placing a hose through the filler tube inlet or opening and down into the fuel held within the fuel tank. A suction pressure is then applied to the opposite end of the hose such that fuel within the tank flows upwardly and out of the tank through the hose. Siphoning generally cannot be accomplished if the hose cannot be placed downwardly into the tank and into the fuel held within the tank.

In order to prevent siphoning of fuel from fuel tanks, anti-siphon devices have been developed. One such anti-siphon device is described in U.S. Pat. No. 4,630,748, entitled Anti-Siphon Fuel Filler Assembly, wherein a tube is inserted into the tank inlet opening. A lower end of the tube is completely compressed together across the tube's diameter and then welded to form a lower restriction in the tube. Holes are cut or stamped in the lower region of the tube thereby allowing fuel to pass therethrough during filling of the fuel tank. The welded end of the tube generally prevents a hose from being placed downwardly into the fuel tank.

The compressing and welding required for such prior art anti-siphon devices is labor intensive and requires certain manufacturing tools such as heavy duty compressing and welding machines. Accordingly, the prior art manufacturing process results in a device having a relatively large manufacturing cost.

There is a need, therefore, for an anti-siphon fuel filler assembly that can be manufactured without expensive compressing and welding equipment, and which can be manufactured with reduced labor intensive manufacturing steps.

SUMMARY OF THE INVENTION

One embodiment of an integrated anti-siphon fuel filler assembly includes a filler tube positioned in a fuel tank opening, the filler tube including a first end region received within said tank and having an anti-siphon insert crimped within said first end region, said anti-siphon insert including a plurality of apertures for allowing fuel flow therethrough, and wherein a second end region of the filler tube is secured to the fuel tank opening.

BRIEF DESCRIPTION OF THE DRAWINGS

FIG. 1 is an isometric view of one embodiment of an integrated anti-siphon fuel filler assembly of the present invention.

FIG. 2 is a cross-sectional side view of the integrated anti-siphon fuel filler assembly taken along line 2-2 of FIG. 1, and shown installed on a fuel tank.

FIG. 3 is an end view of the anti-siphon fuel filler assembly taken along line 3-3 of FIG. 1.

FIG. 4 is a partial cross-sectional side view of the integrated anti-siphon fuel filler assembly taken along line 2-2 of FIG. 1, and shown installed on a fuel tank.

DETAILED DESCRIPTION OF THE PREFERRED EMBODIMENTS

FIG. 1 is an isometric view of one embodiment of an integrated anti-siphon fuel filler assembly of the present invention. Anti-siphon fuel filler assembly 10 in the embodiment shown comprises an elongate cylindrical body portion 12 including a first end region 14 and a second end region 16. First end region 14 is adapted to be received within a fuel filler opening of a fuel tank (see FIG. 2) and second end region 16 is adapted to extend outwardly from or be positioned flush with a fuel tank opening (see FIG. 2). Second end region 16 may be secured to a flange 18 or another type of radially outwardly extending projection secured directly to a fuel tank so as to secure the tube to the fuel tank and against movement through the opening and into the fuel tank (see FIG. 2). Accordingly, flange 18 may have an outer diameter 20 that is greater than an outer diameter 22 of body portion 12 of assembly 10. Body 12, therefore, comprises the filler tube of the assembly, in other words, body 12 directly receives a fuel filler hose or nozzle for filling of fuel into the fuel tank through assembly 10.

Body 12, in a central region 28 thereof, may include a plurality of apertures 30 which may allow fluid and/or air to pass therethrough. Flange 18 may be welded or otherwise secured to the fuel tank such that assembly 10 is not easily removed from the opening in the direction through which the assembly was inserted. Accordingly, flange 18 generally will retain assembly 10 in place on a fuel tank and against tampering or removal of the assembly from the fuel tank after installation thereof.

Body 12 of assembly 10, in the embodiment shown, is manufactured by the process of extrusion, such that body 12 may be seamless along its length 36. Flange 18 and apertures 30 may be formed on/in body 12 after the extrusion process. Body 12 may be manufactured of aluminum but any durable material such as steel or heavy duty plastic may be utilized. Body 12 defines a cylindrical outer surface completely along its length having an absence of removal prevention devices or tube anti-removal structure, such as tabs, extending radially outwardly there from, the absence of removal prevention devices extending along only a length of the body that is positioned within an opening of the fuel tank and in an interior of the fuel tank.

Still referring to FIG. 1, first end region 14 of body 12 may include a first crimp 40 and a second crimp 42 which may secure an anti-siphon insert 44 within an interior 46 of body 12. First crimp 40 may comprise a set of crimped regions, two of which, 40a and 40b, are visible in this figure, that may each extend at least partially around a perimeter 48 of body 12. In the embodiment shown, perimeter 48 defines a circumference of cylindrical body 12. First crimps 40a and 40b may be indented or inwardly protruding regions of body 12 that extend partially into interior 46 of body 12 such that crimped regions 40a and 40b together define a straight line distance 41a and crimped region 42 defines an inner diameter 41b (see FIG. 4) that are both smaller than an inner diameter 43 (see FIG. 4) of a remainder of body 12. In the embodiment shown, length 36 of body 12 may be in a range of approximately seven to twelve inches, and first crimps 40a and 40b may be positioned approximately ¾ of an inch from a lower end 50 of body 12. Crimps 40a and 40b may extend into interior 46 of body 12 approximately 1/16 of an inch. First crimp 40, including 40a and 40b, may be added to body 12 after extrusion of body 12. Projection of first crimp 40 into interior 46 of body 12 only through a potion of interior 46, such as only 1/16 of an inch, generally requires less compression force than completely compressing body 12 across its diameter to close off the opening in first end region 14 of body 12. Accordingly, the crimping process of the present invention requires reduced sized crimping machinery than the heavy duty compressing machinery of prior art devices. Accordingly, the present invention has reduced manufacturing costs when compared to prior art anti-siphon assemblies.

Second crimp 42 may comprise a crimped region that extends completely around perimeter 48 at lower end 50 of body 12. Second crimp 42 may be manufactured on body 12 after extrusion thereof. Second crimped region 42 may be an indentation or an inwardly protruding region of body 12 that defines an inner diameter (see FIG. 3) that is smaller than an inner diameter (see FIG. 3) of a remainder of body 12. Second crimp 42 may extend into interior 46 of body 12 approximately ⅛ of an inch and may define an angle (see FIG. 2) of approximately 45 degrees with respect to length 36 of body 12. Accordingly, crimps 40 and 42 may retain insert 44 within interior 46 and between the first and second crimped regions 40 and 42 such that insert 44 may not be easily dislodged from body 12 by a vandal.

FIG. 2 is a cross-sectional side view of the anti-siphon fuel filler assembly 10 taken along line 2-2 of FIG. 1, and shown installed on a fuel tank 52. In particular, assembly 10 may be installed within an opening 56 of fuel tank 52. Flange 18 extends outwardly from opening 56 and may be secured around opening 56 and to the exterior surface 53 of fuel tank 52 by any means, such as by welding, such that body 12 generally is fixedly secured within opening 56.

Still referring to FIG. 2, first crimp 40 is shown extending inwardly into interior 46 of body 12 a distance 64 of approximately 1/16 inch. Crimp 42 is shown extending inwardly into interior 46 of body 12 a distance 66 of approximately ⅛ inch and defining an angle 68 of approximately forty-five degrees. In other embodiments, crimps 40 and/or 42 may extend into interior 46 any distance less than the radius or midway point of a cross section of interior 46 such that crimps 40 and/or 42 do not meet one another. In other words, crimps 40 and/or 42 do not completely close off interior 46 of body 12 of assembly 10 but merely act as projections to secure an anti-siphon insert 44 therein.

FIG. 3 is an end view of the anti-siphon fuel filler assembly 10 taken along line 3-3 of FIG. 1. Flange 18 is shown extending outwardly from body 12. End 50 of body 12 is shown having second crimp 42 therein. Anti-siphon insert 44 is shown secured within interior 46 of body 12 between crimps 40 and 42. Insert 44 may have a cross sectional shape which may be described as a snowflake or a hub-and-spoke arrangement. The hub-and-spoke shape of insert 44 may include a central hub 70 having a plurality of spokes 72 extending outwardly therefrom. Spokes 72 may define a plurality of apertures 76 positioned therebetween. Apertures 76 may be sized so as to allow fuel and air to easily flow through insert 44, but may be sized so as to prevent insertion of a siphon hose therethrough and into interior 62 of fuel tank 52. The cylindrically symmetrical shape of insert 44 may add strength and stability to insert 44 such that insert 44 may not be easily broken or damaged by a vandal attempting to force a hose into tank 52 or a pry bar into assembly 10 to remove the assembly from the fuel tank. Of course, other shapes and designs of insert 44 may be utilized in other embodiments of the present invention. Insert 44 may be manufactured of aluminum but any durable material such as steel or heavy duty plastic may be utilized.

Insert 44 typically may have a structure that is symmetrical about a central point of the insert, such as the snowflake or hub-and-spoke shape as shown, such that the insert may be easily manufactured by the process of extrusion, such that the insert may have an absence of weld seams along its length. In particular, insert 44 may be extruded as a single, long piece of material and then cut across its cross-section at predetermined positions, such as every half inch, along its length to define individual inserts 44. Insert 44 generally will have an outer diameter 78 that is slightly smaller than the inner diameter 80 of body 12 such that insert 44 is snugly received therein. Moreover, the outer diameter 78 of insert 44 generally will be larger than the inner diameter of body 12 at first crimp 40 and the inner diameter 84 of body 12 at second crimp 42. Accordingly, insert 44 may retained within body 12 between crimps 40 and 42 such that the method of the present invention may include: providing body 12, creating a first crimp, placing an insert 44 within body 12, then creating a second crimp opposite the first crimp to secure insert 44 within body 12 and between the two crimps. This extrusion and cutting process of insert 44, and the process of placing the insert within body 12 between the creation of crimps 40 and 42, may result in an anti-siphon device 10 that is relatively inexpensive to manufacture and assemble yet which provides high strength and reliability. The method of manufacturing the present invention may further include securing body 12 to flange 18, and then securing flange 18 to the exterior of a fuel tank 52 at an opening 56 within the fuel tank 52.

FIG. 4 is a partial cross-sectional side view of the integrated anti-siphon fuel filler assembly 10 taken along line 2-2 of FIG. 1, and shown installed on a fuel tank 52. Body 12 is shown secured to flange 18 at a neck region 90 of flange 18 wherein neck region 90 of flange 18 is curved over upon itself to define a smooth edged opening 92 for placement of a fuel filler nozzle therein during filling of fuel tank 52 with fuel. Due to the securement of body 12 directly to flange 18, and securement of flange 18 directly to a fuel tank 52, only body 12 is positioned within the opening 56 of the fuel tank and, therefore, a separate fuel filler tube including an anti-siphon insert is not necessary, thereby reducing manufacturing costs of the anti-siphon assembly.

In the above description numerous details have been set forth in order to provide a more through understanding of the present invention. It will be obvious, however, to one skilled in the art that the present invention may be practiced using other equivalent designs.

We claim:

1. An anti-siphon fuel filler assembly, comprising:
   a fuel tank that defines a tank wall having an exterior surface and an interior surface with an aperture extending therebetween, said exterior and interior surfaces each having a lack of discontinuities in a region surrounding said aperture;
   a tube including a first end region adapted to be positioned through said aperture of said fuel tank and positioned in an interior of said fuel tank for allowing fuel to flow therethrough into said tank, said first end region including a first crimp and a second crimp, said tube defining a cylindrical outer surface completely along a length of said tube and having an absence of tube anti-removal structure extending radially outwardly therefrom along only a portion of the tube that is positioned within said aperture and within said interior of said fuel tank;

a restriction structure positioned in said tube between said first crimp and said second crimp, said restriction structure including apertures sized for allowing fuel to flow therethrough while preventing the insertion of a siphon hose into said tank; and said tube including a second end region positioned exterior of said fuel tank and secured directly to a flange that extends outwardly from said tube and over said exterior surface of said tank wall, said flange secured directly and only to said exterior surface of said tank wall of said fuel tank;

wherein said tube defines a tube inner diameter, said first crimp defines a straight line distance between a plurality of first crimps, said second crimp defines a second crimp inner diameter, said restriction structure defines a restriction structure outside diameter, and wherein said restriction structure outside diameter is greater than said first crimp straight line distance and said second crimp inner diameter and is smaller than said tube inner diameter.

2. An anti-siphon assembly according to claim 1 wherein said restriction structure is manufactured by the process of extrusion and includes an absence of weld seams along its length.

3. An anti-siphon assembly according to claim 1 wherein said restriction structure comprises a hub and a plurality of spokes extending outwardly therefrom.

4. An anti-siphon assembly according to claim 1 wherein said first crimp includes a plurality of crimped regions positioned around a perimeter of said first end region of said tube.

5. An anti-siphon assembly according to claim 1 wherein said second crimp includes a crimped region that extends completely around a perimeter of an end of said first end region of said tube.

6. An anti-siphon assembly according to claim 1 wherein said tube and said restriction structure are manufactured of an extrudable material.

7. An anti-siphon assembly according to claim 1 wherein said first and second crimps each define a deflection that extends into an interior of said tube less than a distance of a radius of said tube.

8. An anti-siphon assembly according to claim 3 wherein said hub defines an opening therein and wherein said plurality of spokes each define an opening therebetween so as to allow the flow of fuel therethrough.

* * * * *